US012317358B2

(12) United States Patent
Chen

(10) Patent No.: US 12,317,358 B2
(45) Date of Patent: May 27, 2025

(54) TRANSMISSION METHOD AND APPARATUS FOR AI-NATIVE SERVICE, AND STORAGE MEDIUM

(71) Applicant: DATANG MOBILE COMMUNICATIONS EQUIPMENT CO., LTD., Beijing (CN)

(72) Inventor: Li Chen, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 0 days.

(21) Appl. No.: 18/698,787

(22) PCT Filed: Sep. 29, 2022

(86) PCT No.: PCT/CN2022/122862
§ 371 (c)(1),
(2) Date: Apr. 5, 2024

(87) PCT Pub. No.: WO2023/066009
PCT Pub. Date: Apr. 27, 2023

(65) Prior Publication Data
US 2024/0334524 A1    Oct. 3, 2024

(30) Foreign Application Priority Data
Oct. 22, 2021   (CN) .......................... 202111231461.6

(51) Int. Cl.
*H04W 76/19*    (2018.01)
(52) U.S. Cl.
CPC ................... *H04W 76/19* (2018.02)
(58) Field of Classification Search
CPC . H04W 76/19; H04W 24/02; H04W 74/0833; H04W 4/50; H04W 76/00; H04W 76/10; H04W 76/27; H04W 74/004; H04L 41/16
See application file for complete search history.

(56) References Cited
U.S. PATENT DOCUMENTS 11,863,400 B2 *  1/2024 Ma .......................... H04L 41/16
2019/0140913 A1  5/2019 Guim Bernat et al.
(Continued)

FOREIGN PATENT DOCUMENTS

| CN | 102388669 A | 3/2012 |
| CN | 103108404 A | 5/2013 |

(Continued)

OTHER PUBLICATIONS

State Intellectual Property Office of the People's Republic of China, International Search Report and written opinion issued in Application No. PCT/CN2022/122862, Dec. 16, 2022, 12 pages.

(Continued)

*Primary Examiner* — Will W Lin
(74) *Attorney, Agent, or Firm* — Kilpatrick Townsend & Stockton LLP

(57) ABSTRACT

The present disclosure provides a transmission method and apparatus for an AI-native service, and a storage medium. A terminal sends an AI-native service establishment request to a base station through air interface signaling; the base station determines to establish the AI-native service according to the AI-native service establishment request and sends AI-native service establishment indication information to the terminal. Then data and/or signaling of the AI-native service can be transmitted between the base station and the terminal over a radio bearer (RB) carrying the AI-native service. In the embodiment, the data and/or the signaling of the AI-native service serves as an independent service flow and is transmitted over a specific radio bearer between the base station and the terminal, to ensure reliable transmission of the data and/or the signaling of the AI-native service.

19 Claims, 4 Drawing Sheets

(56) References Cited

U.S. PATENT DOCUMENTS

| | | | |
|---|---|---|---|
| 2020/0236726 A1 | 7/2020 | Lee et al. | |
| 2021/0136635 A1 | 5/2021 | Kim et al. | |
| 2021/0144517 A1 | 5/2021 | Guim Bernat et al. | |
| 2022/0150727 A1* | 5/2022 | Pezeshki | H04L 41/145 |
| 2023/0093963 A1* | 3/2023 | Kumar | H04W 76/27 370/252 |
| 2023/0209390 A1* | 6/2023 | Zeng | H04W 24/02 |
| 2023/0232213 A1* | 7/2023 | Hong | H04W 8/24 370/329 |
| 2023/0389057 A1* | 11/2023 | Deenoo | H04W 72/50 |
| 2024/0029264 A1* | 1/2024 | Mu | H04L 41/16 |

FOREIGN PATENT DOCUMENTS

| | | |
|---|---|---|
| CN | 105323867 A | 2/2016 |
| CN | 107949016 A | 4/2018 |
| WO | 2021063515 A1 | 4/2021 |
| WO | 2021218302 A1 | 11/2021 |

OTHER PUBLICATIONS

The extended European search report received in the counterpart European Application 22882620.2, mailed on Jan. 21, 2025.
The office action issued in Japanese corresponding application 2024-522374, mailed on Feb. 18, 2025.
Prepared by OPPO, Samsung, "Study on 5G System Support for Application AI/ML-based Services (FS_5GAIML)", 3GPP TSG SA WG2 #146E, Aug. 16-27, 2021, Electronic meeting, S2-2105451.
Huawei et al. , "Access control in NR" , 3GPP TSG-RAN WG2 Meeting Ad hoc, Spokane, USA, Jan. 16-20, 2017, R2-1700095.
3rd Generation Partnership Project; Technical Specification Group Radio Access Network; NR; Radio Resource Control (RRC) protocol specification (Release 16) , 3GPP TS 38.331 V16.6.0, Sep. 2021.

* cited by examiner

TRANSMISSION METHOD AND APPARATUS FOR AI-NATIVE SERVICE, AND STORAGE MEDIUM

CROSS-REFERENCE TO RELATED APPLICATION

This application is national stage of International Application No. PCT/CN2022/122862, filed on Sep. 29, 2022, which claims priority to Chinese Patent Application No. 202111231461.6, entitled "TRANSMISSION METHOD AND APPARATUS FOR AI-NATIVE SERVICE, AND STORAGE MEDIUM" and filed with the China National Intellectual Property Administration on Oct. 22, 2021. The contents of afore-mentioned applications are hereby incorporated by reference in their entireties.

FIELD

The present disclosure relates to the field of communication technology and, in particular, to a transmission method and apparatus for an AI-native service, and a storage medium.

BACKGROUND

Services in the existing 3GPP (3rd Generation Partnership Project) wireless communication network are end-to-end services, in which a service establishment process is initiated and completed through NAS signaling between a terminal and a core network. With the introduction of artificial intelligence, machine learning modules are embedded in various nodes (including base stations and terminals) of wireless mobile communication networks. Correspondingly, the base stations and the terminals have functions such as model signaling, data processing, and edge computing. A service generated by application of artificial intelligence in wireless communication networks is one of typical examples of an AI-native service. Characteristics of the AI-native service are: a starting point and an end point of the service are both within the system, and the AI-native service does not directly serve end users, but is built to solve complex problems of the mobile communication system or improve performance.

During performing data processing and machine learning model transmission, the AI-native service has a characteristic that data stream is large and cannot be transmitted as physical layer signaling, but can only be transmitted as a type of independent service flows through a data bearer. In addition, depending on different types of machine learning, there are different requirements in terms of latency and reliability. For example, an inference process has a high-level latency requirement; and a delivery of an inference result and a model has a high-level reliability requirement. Transmission approaches in the prior art cannot meet transmission requirements of the AI-native service and cannot guarantee reliable transmission of AI-native service data or signaling.

SUMMARY

The present disclosure provides a transmission method and apparatus for an AI-native service, and a storage medium, to establish an AI-native service transmission channel between a base station and a terminal to ensure reliable transmission of AI-native service data or signaling.

In one embodiment of the present disclosure provides a transmission method for an AI-native service, where the method is applied to a terminal and includes:
  sending an AI-native service establishment request to a base station through air interface signaling;
  receiving AI-native service establishment indication information sent by the base station;
  transmitting, according to the AI-native service establishment indication information, data and/or signaling of the AI-native service between the terminal and the base station over a radio bearer (RB) carrying the AI-native service.

In a possible design, the sending the AI-native service establishment request to the base station through the air interface signaling includes at least one of:
  sending a random access request to the base station by using a preset preamble and/or a preset physical random access channel (PRACH) resource corresponding to the AI-native service; or
  sending a radio resource control (RRC) establishment request message to the base station, where an establishment reason included in the RRC establishment request message is set to be AI-native service establishment; or
  sending an RRC recovery request message to the base station, where a recovery reason included in the RRC recovery request message is set to be AI-native service establishment; or
  sending first RRC signaling to the base station when the terminal is in an RRC connected state, where the first RRC signaling is an AI-native service establishment request message which includes one or more of: an AI-native service establishment request, an AI-native service type, an AI-native service cycle, an AI-native service life cycle, an AI-native service QoS requirement.

In a possible design, the AI-native service includes at least one of:
  learning model sharing, computing power sharing, computing power interaction, cloud processing data sharing, and intelligent task segmentation.

In a possible design, before sending the random access request to the base station by using the preset preamble and/or the preset physical random access channel (PRACH) resource corresponding to the AI-native service, the method further includes:
  receiving a system message of a radio access network system sent by the base station, where the system message includes the preset preamble and/or the preset PRACH resource corresponding to the AI-native service; or
  receiving, when the terminal is in the RRC connected state, second RRC signaling sent by the base station, where the second RRC signaling includes the preset preamble and/or the preset PRACH resource corresponding to the AI-native service.

In a possible design, the sending the radio resource control (RRC) establishment request message to the base station includes:
  sending the radio resource control (RRC) establishment request message to the base station if the terminal is in an RRC idle state.

In a possible design, the sending the RRC recovery request message to the base station includes:
  sending the radio resource control (RRC) recovery request message to the base station if the terminal is in an RRC inactive state.

In a possible design, the receiving the AI-native service establishment indication information sent by the base station includes:

receiving any of following messages sent by the base station, where any of the following messages includes the AI-native service establishment indication information:

an RRC connection establishment message, an RRC connection reconfiguration message, an RRC connection recovery message, and third RRC signaling.

In a possible design, the RB includes signaling radio bearers: SRB0, SRB1, SRB2 or a data radio bearer (DRB).

In a possible design, the AI-native service establishment indication information includes a DRB configuration parameter;

the transmitting the data and/or the signaling of the AI-native service between the terminal and the base station over the radio bearer (RB) carrying the AI-native service includes:

establishing a DRB according to the DRB configuration parameter;

transmitting the data and/or the signaling of the AI-native service over the DRB.

In one embodiment of the present disclosure provides a transmission method for an AI-native service, where the method is applied to a base station and includes:

receiving an AI-native service establishment request sent by a terminal through air interface signaling;

determining to establish the AI-native service according to the AI-native service establishment request, and sending AI-native service establishment indication information to the terminal;

transmitting data and/or signaling of the AI-native service between the base station and the terminal over a radio bearer (RB) carrying the AI-native service.

In a possible design, the RB includes signaling radio bearers: SRB0, SRB1, SRB2 or a data radio bearer (DRB).

In a possible design, the transmitting the data and/or the signaling of the AI-native service between the base station and the terminal over the radio bearer (RB) carrying the AI-native service includes:

adopting SRB1 or SRB2 as the RB carrying the AI-native service, after air interface security is activated;

transmitting the data and/or the signaling of the AI-native service between the base station and the terminal over SRB1 or SRB2; or adopting SRB0 as the RB carrying the AI-native service, if the air interface security is not activated;

transmitting the data and/or the signaling of the AI-native service between the base station and the terminal over SRB0.

In a possible design, the sending the AI-native service establishment indication information to the terminal includes:

after air interface security is activated, establishing, according to an AI-native service requirement, a DRB dedicated to carrying the AI-native service, and sending the AI-native service establishment indication information to the terminal, where the AI-native service establishment indication information includes a DRB configuration parameter, and the terminal establishes a corresponding DRB according to the DRB configuration parameter for transmission of the data and/or the signaling of the AI-native service over the DRB.

In a possible design, the transmitting the data and/or the signaling of the AI-native service between the base station and the terminal over the radio bearer (RB) carrying the AI-native service includes:

if the terminal is in an RRC inactive state, recovering, in a case that the terminal does not enter an RRC connected state, a DRB carrying the AI-native service pre-stored in terminal context;

transmitting the data and/or the signaling of the AI-native service between the base station and the terminal over the recovered DRB carrying the AI-native service.

In a possible design, the sending the AI-native service establishment indication information to the terminal includes:

sending any of following messages to the terminal, where any of the following messages includes the AI-native service establishment indication information:

an RRC connection establishment message, an RRC connection reconfiguration message, an RRC connection recovery message, and third RRC signaling.

In one embodiment of the present disclosure provides a terminal, including a memory, a transceiver, and a processor;

the memory is configured to store a computer program; the transceiver is configured to send and receive data under a control of the processor; the processor is configured to read the computer program in the memory and perform following operations:

sending an AI-native service establishment request to a base station through air interface signaling;

receiving AI-native service establishment indication information sent by the base station;

transmitting, according to the AI-native service establishment indication information, data and/or signaling of the AI-native service between the terminal and the base station over a radio bearer (RB) carrying the AI-native service.

In a possible design, when sending the AI-native service establishment request to the base station through the air interface signaling, the processor is configured to perform at least one of:

sending a random access request to the base station by using a preset preamble and/or a preset physical random access channel (PRACH) resource corresponding to the AI-native service; or sending a radio resource control (RRC) establishment request message to the base station, where an establishment reason included in the RRC establishment request message is set to be AI-native service establishment; or sending an RRC recovery request message to the base station, where a recovery reason included in the RRC recovery request message is set to be AI-native service establishment; or sending first RRC signaling to the base station when the terminal is in an RRC connected state, where the first RRC signaling is an AI-native service establishment request message which includes one or more of: an AI-native service establishment request, an AI-native service type, an AI-native service cycle, an AI-native service life cycle, an AI-native service QoS requirement.

In a possible design, the AI-native service includes at least one of:

learning model sharing, computing power sharing, computing power interaction, cloud processing data sharing, and intelligent task segmentation.

In a possible design, before the sending the random access request to the base station by using the preset preamble and/or the preset physical random access channel (PRACH) resource corresponding to the AI-native service, the processor is further configured to:
  receive a system message of a radio access network system sent by the base station, in which the system message includes the preset preamble and/or the preset PRACH resource corresponding to the AI-native service; or
  receive, when the terminal is in the RRC connected state, second RRC signaling sent by the base station, where the second RRC signaling includes the preset preamble and/or the preset PRACH resource corresponding to the AI-native service.

In a possible design, when sending the radio resource control (RRC) establishment request message to the base station, the processor is configured to:
  send the radio resource control (RRC) establishment request message to the base station if the terminal is in an RRC idle state.

In a possible design, when sending the RRC recovery request message to the base station, the processor is configured to:
  send the radio resource control (RRC) recovery request message to the base station if the terminal is in an RRC inactive state.

In a possible design, when receiving the AI-native service establishment indication information sent by the base station, the processor is configured to:
  receive any of following messages sent by the base station, in which any of the following messages includes the AI-native service establishment indication information:
  an RRC connection establishment message, an RRC connection reconfiguration message, an RRC connection recovery message, and third RRC signaling.

In a possible design, the RB includes signaling radio bearers: SRB0, SRB1, SRB2 or a data radio bearer (DRB).

In a possible design, the AI-native service establishment indication information includes a DRB configuration parameter;
  when transmitting the data and/or the signaling of the AI-native service between the terminal and the base station over the radio bearer (RB) carrying the AI-native service, the processor is configured to:
  establish a DRB according to the DRB configuration parameter;
  transmit the data and/or the signaling of the AI-native service over the DRB.

In one embodiment of the present disclosure provides a base station, including a memory, a transceiver, and a processor;
  the memory is configured to store a computer program;
  the transceiver is configured to send and receive data under a control of the processor; the processor is configured to read the computer program in the memory and perform following operations:
  receiving an AI-native service establishment request sent by a terminal through air interface signaling;
  determining to establish an AI-native service according to the AI-native service establishment request, and sending AI-native service establishment indication information to the terminal;
  transmitting data and/or signaling of the AI-native service between the base station and the terminal over a radio bearer (RB) carrying the AI-native service.

In a possible design, the RB includes signaling radio bearers: SRB0, SRB1, SRB2 or a data radio bearer (DRB).

In a possible design, when transmitting the data and/or the signaling of the AI-native service between the base station and the terminal over the radio bearer (RB) carrying the AI-native service, the processor is configured to:
  adopt SRB1 or SRB2 as the RB carrying the AI-native service, after air interface security is activated;
  transmit the data and/or the signaling of the AI-native service between the base station and the terminal over SRB1 or SRB2; or
  adopt SRB0 as the RB carrying the AI-native service, if the air interface security is not activated;
  transmit the data and/or the signaling of the AI-native service between the base station and the terminal over SRB0.

In a possible design, when sending the AI-native service establishment indication information to the terminal, the processor is configured to:
  after air interface security is activated establish, according to an AI-native service requirement, a DRB dedicated to carrying the AI-native service, and send the AI-native service establishment indication information to the terminal, where the AI-native service establishment indication information includes a DRB configuration parameter, and the terminal establishes a corresponding DRB according to the DRB configuration parameter for transmission of the data and/or the signaling of the AI-native service over the DRB.

In a possible design, when transmitting the data and/or the signaling of the AI-native service between the base station and the terminal over the radio bearer (RB) carrying the AI-native service, the processor is configured to:
  if the terminal is in an RRC inactive state, recover, in a case that the terminal does not enter an RRC connected state, a DRB carrying the AI-native service pre-stored in terminal context;
  transmit the data and/or the signaling of the AI-native service between the base station and the terminal over the recovered DRB carrying the AI-native service.

In a possible design, when sending the AI-native service establishment indication information to the terminal, the processor is configured to:
  send any of following messages to the terminal, where any of the following messages includes the AI-native service establishment indication information:
  an RRC connection establishment message, an RRC connection reconfiguration message, an RRC connection recovery message, and third RRC signaling.

In one embodiment of the present disclosure provides a transmission apparatus for an AI-native service, including:
  a request unit, configured to send an AI-native service establishment request to a base station through air interface signaling;
  a receiving unit, configured to receive AI-native service establishment indication information sent by the base station;
  a transmission unit, configured to transmit, according to the AI-native service establishment indication information, data and/or signaling of the AI-native service between the transmission apparatus and the base station over a radio bearer (RB) carrying the AI-native service.

In one embodiment of the present disclosure provides a transmission apparatus for an AI-native service, including:
  a receiving unit, configured to receive an AI-native service establishment request sent by a terminal through air interface signaling;

a sending unit, configured to determine to establish the AI-native service according to the AI-native service establishment request, and send AI-native service establishment indication information to the terminal;

a transmission unit, configured to transmit data and/or signaling of the AI-native service between the transmission apparatus and the terminal over a radio bearer (RB) carrying the AI-native service.

In one embodiment of the present disclosure provides a processor-readable storage medium, where the processor-readable storage medium stores a computer program, and the computer program is used to cause a processor to execute the method described in the embodiments.

The present disclosure provides a transmission method and apparatus for an AI-native service and a storage medium. A terminal sends an AI-native service establishment request to a base station through air interface signaling; the base station determines to establish the AI-native service according to the AI-native service establishment request and sends AI-native service establishment indication information to the terminal. Then data and/or signaling of the AI-native service can be transmitted between the base station and the terminal over a radio bearer (RB) carrying the AI-native service. In the embodiment, the data and/or the signaling of the AI-native service serves as an independent service flow and is transmitted over a specific radio bearer between the base station and the terminal, to ensure reliable transmission of the data and/or the signaling of the AI-native service.

It should be understood that the content described in the above summary section is not intended to define key or important features of the embodiments of the present disclosure, nor is it used to limit the scope of the present disclosure. Other features of the present disclosure will become apparent from the description below.

BRIEF DESCRIPTION OF DRAWINGS

In order to illustrate the embodiments of the present disclosure more clearly, the drawings required for the description of embodiments will be briefly introduced below. The drawings in the following description are some embodiments of the present disclosure.

DESCRIPTION OF EMBODIMENTS

Figure 1:
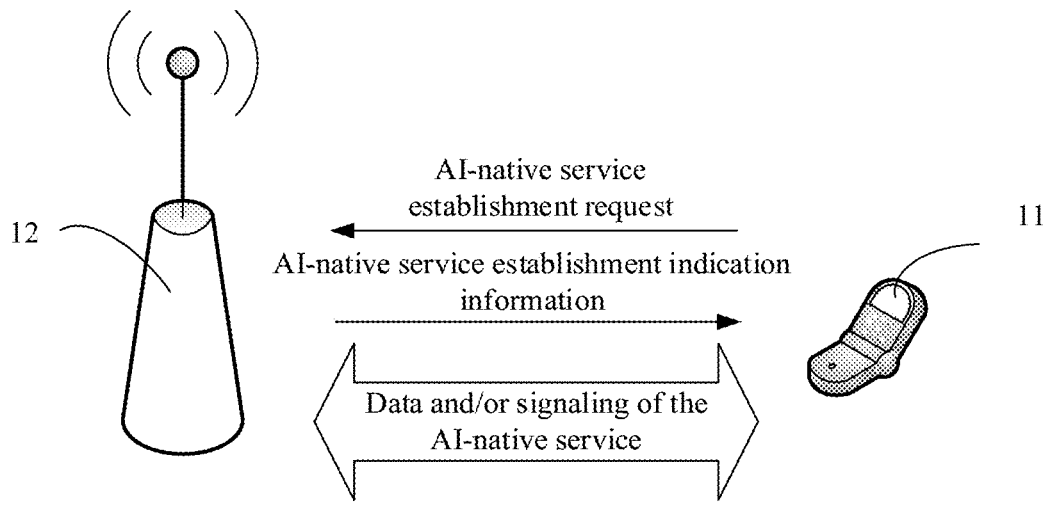
FIG. 1 is a schematic diagram of a system for a transmission method for an AI-native service provided by an embodiment of the present disclosure.

The term "and/or" in the present disclosure describes the association relationship between associated objects, indicating that there can be three relationships, for example, A and/or B, which can mean three cases: A alone exists; A and B exist simultaneously; and B alone exists. The character "/" generally indicates that related objects before and after are in an "or" relationship.

In the embodiment of this disclosure, the term "a plurality of" refers to two or more than two, and other quantifiers are similar to it.

Services in the existing 3GPP wireless communication network are end-to-end services, where a service establishment process is initiated and completed through NAS signaling between a terminal and a core network. A service establishment process initiated by the terminal is as follows. If the terminal is in an RRC (Radio Resource Control) connected state, it directly performs signaling interaction with the core network and initiates a service request through air interface NAS (Non-access stratum) direct transfer; if the terminal is in an RRC Idle state, an RRC connection needs to be established; and if the terminal is in an RRC Inactive state, the RRC connection needs to be recovered and a service establishment process needs to be initiated. Taking a terminal in the RRC Idle state as an example, when the terminal needs to initiate a service request, it initiates the process of establishing a RRC connection with a base station. The terminal directly sends a NAS connection request message (service request) to the core network through the NAS direct transfer carried in the RRC signaling, the core network establishes a service connection with the terminal, and then the core network sends the service connection and service-related information to the base station, according to which the base station establishes a service bearer RB (radio bearer) carrying the service between the base station and the terminal, and notifies the terminal via an RRC reconfiguration message. For the service request initiated by the terminal in the RRC Idle state, the terminal has EstablishmentCause carried in the RRC connection request message RRCSetupRequest to indicate the reason for establishing the RRC connection, and then sends a service request NAS message to the core network. For a terminal in the RRC Inactive state, the terminal has ResumeCause carried in the RRCResumeRequest or RRCResumeRequest1 to indicate the reason for recovering the RRC connection, and then sends a service request NAS message to the core network.

With the introduction of artificial intelligence, machine learning modules are embedded in various nodes (including base stations and terminals) of wireless mobile communication networks. Correspondingly, the base stations and the terminals have functions such as model signaling, data processing, and edge computing. A service generated by the application of artificial intelligence in wireless communication networks is one of the typical examples of an AI-native service. The characteristics of the AI-native service are: a starting point and an end point of the service are both within the system, and the AI-native service does not directly serve end users, but is built to solve complex problems of the mobile communication system or improve performance.

The AI-native service can be learning model sharing, computing power sharing, computing power interaction, cloud processing data sharing, intelligent task segmentation, etc. For example, in a federated learning system, terminal A performs data preprocessing and transmits the preprocessed data to another network device through the base station to infer an intermediate result and transmit the inferred intermediate result to terminal B. Terminal B can infer a final result and report the inferred final result to the network device through the base station.

During performing data processing and machine learning model transmission, the AI-native service has a characteristic that data stream is large and cannot be transmitted as physical layer signaling but can only be transmitted as an independent service flow through a data bearer. In addition, depending on different types of machine learning, there are different requirements in terms of latency and reliability. For example, an inference process has high-level latency requirements; a delivery of an inference result and a model has high-level reliability requirements. Transmission approaches in the prior art cannot meet the transmission requirements of the AI-native service and cannot guarantee the reliable transmission of AI-native service data or signaling.

In order to solve the above problems, the present disclosure provides a transmission method for an AI-native service. For the AI-native service, a specific transmission channel for carrying the AI-native service is established between a base station and a terminal to ensure reliable transmission of AI-native service data or signaling. Specifically, the terminal can send an AI-native service establishment request to the base station through air interface signaling; the base station determines to establish the AI-native service according to the AI-native service establishment request, and sends AI-native service establishment indication information to the terminal; in response to the AI-native service establishment indication information, a radio bearer (RB) that carries the AI-native service is designated or established between the terminal and the base station, and then data and/or signaling of the AI-native service can be transmitted between the terminal and the base station over the RB. In one embodiment, the RB includes signaling radio bearers: SRB0, SRB1, SRB2 or a data radio bearer (DRB).

An embodiment of the present disclosure provides a transmission method for an AI-native service, which is applicable to a system as shown in FIG. 1. The system includes a terminal 11 and a base station 12. The terminal 11 can send an AI-native service establishment request to the base station 12 through air interface signaling; the base station 12 determines to establish the AI-native service according to the AI-native service establishment request, and sends AI-native service establishment indication information to the terminal 11; in response to the AI-native service establishment indication information, a radio bearer (RB) carrying the AI-native service is designated or established between the terminal 11 and the base station 12, and then data and/or signaling of the AI-native service can be transmitted between the terminal 11 and the base station 12 over the RB.

Embodiments of the present disclosure can be applied to a variety of systems, especially a 5G system. For example, an applicable system may be a global system of mobile communication (GSM) system, a code division multiple access (CDMA) system, a wideband code division multiple access (WCDMA) general packet radio service (GPRS) system, a long term evolution (LTE) system, an LTE frequency division duplex (FDD) system, an LTE time division duplex (TDD) system, a long term evolution advanced (LTE-A) system, a universal mobile telecommunication system (UMTS), a worldwide interoperability for microwave access (WiMAX) system, a 5G new radio (NR) system, etc. Each of these various systems includes a terminal device and a network device. The system can also include a core network part, such as an evolved packet system (EPS), a 5G system (5GS), etc.

The terminal device involved in the embodiments of the present disclosure may refer to a device that provides voice and/or data connectivity to users, a handheld device with a wireless connection function, or other processing devices connected to a wireless modem, etc. In different systems, the terminal device may also have different names. For example, in a 5G system, the terminal device may be called a user equipment (UE). A wireless terminal device can communicate with one or more core networks (CN) via a radio access network (RAN). The wireless terminal device can be a mobile terminal device, such as a mobile phone (or known as a "cellular" phone), and a computer with a mobile terminal device, which may be, for example, portable, pocket-sized, handheld, computer-built-in or vehicle-mounted mobile apparatuses, such as a personal communication service (PCS) phone, a cordless phone, a session initiated protocol (SIP) phone, a wireless local loop (WLL) station, a personal digital assistant (PDA) and other devices, which exchanges language and/or data with the radio access network. Wireless terminal device may also be called a system, a subscriber unit, a subscriber station, a mobile station, a mobile, a remote station, an access point, a remote terminal, an access terminal, a user terminal, a user agent, a user device, which is not limited in the embodiments of the present disclosure.

The base stations involved in the embodiments of the present disclosure may also be other network devices, and a based station may include multiple cells that provide services for terminals. According to different specific application occasions, the base station may also called an access point, or may refer to devices in communication with the wireless terminal devices through one or more sectors in an air interface in an access network, or devices with other names. The network device may be configured to interconvert a received air frame and an internet protocol (IP) packet and serves as a router between the wireless terminal devices and remaining parts of the access network, where the remaining parts of the access network may include an internet protocol (IP) communication network. The network device may further coordinate attribute management to the air interface. For example, the network devices involved in the embodiments of the present application may be network devices (Base Transceiver Station, BTS) in the global system for mobile communications (GSM) or code division multiple access (CDMA), or network devices (NodeB) in wide-band code division multiple access (WCDMA), or evolutional network devices (evolutional Node B, eNB or e-NodeB) in a long term evolution (LTE) system, or a 5G base station (gNB) in a 5G network architecture (next generation system), or a home evolved node B (HeNB), a relay node, a femto, a pico, etc., which is not limited in the embodiments of the present disclosure. In some network structures, the network device may include a centralized unit (CU) node and a distributed unit (DU) node, and the centralized unit and the distributed unit may also be arranged geographically separately.

The embodiments of the present disclosure will be clearly and comprehensively described below with reference to the drawings in the embodiments of the present disclosure. The described embodiments are only some of the embodiments of the present disclosure, not all of them.

The method and the apparatus are based on the same application concept. Since principles of the method and the apparatus to solve the problem are similar, reference can be made to each other for the implementation of the apparatus and the method, and repeated details will not be described.

Figure 2:
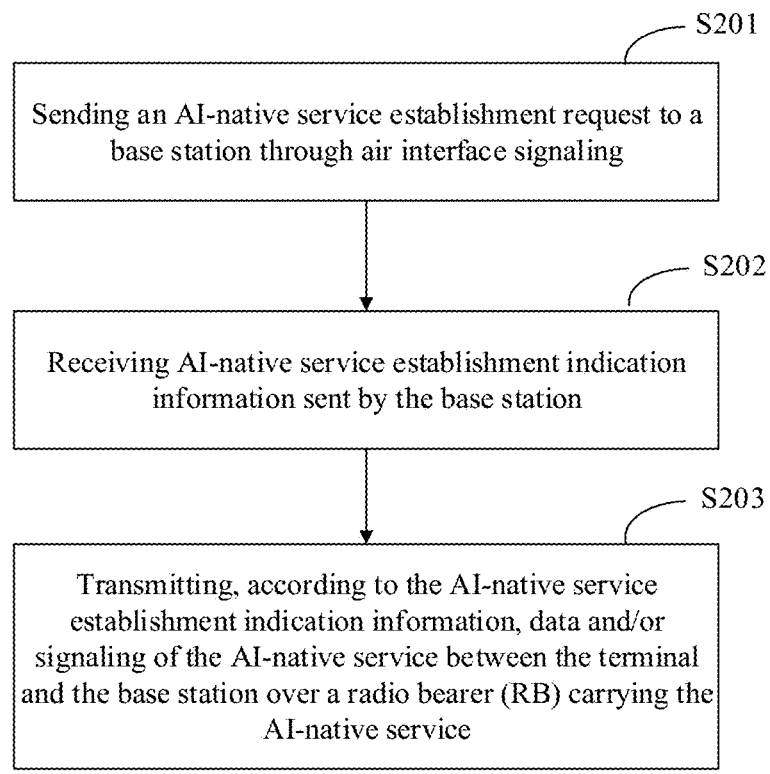
FIG. 2 is a flow chart of a transmission method for an AI-native service provided by an embodiment of the present disclosure.

FIG. 2 is a flow chart of a transmission method for an AI-native service provided by an embodiment. As shown in FIG. 2, this embodiment provides a transmission method for an AI-native service, and the execution body is a terminal UE. Specific steps of the method are as follows.

S201, sending an AI-native service establishment request to a base station through air interface signaling.

In this embodiment, the AI-native service includes but is not limited to at least one of: learning model sharing, computing power sharing, computing power interaction, cloud processing data sharing, and intelligent task segmentation. During performing data processing and machine learning model transmission, since the AI-native service has a characteristic that data stream is large and cannot be transmitted as physical layer signaling, it can only be transmitted as an independent service flow through a data bearer. In addition, depending on different types of machine learning, there are different requirements in terms of latency and reliability. For example, an inference process has high-level latency requirements; a delivery of an inference result and a model has high-level reliability requirements. Therefore, in this embodiment, consideration is given to establishing a specific transmission channel for carrying the AI-native service between the terminal and the base station.

When it is necessary to establish an AI-native service, the terminal can send an AI-native service establishment request to the base station through air interface signaling, and the base station determines whether to accept the base station to establish an AI-native service based on the AI-native service request.

In one embodiment, the sending the AI-native service establishment request to the base station through the air interface signaling includes at least one of:
method 1: sending a random access request to the base station by using a preset preamble and/or a preset physical random access channel (PRACH) resource corresponding to the AI-native service;
method 2: sending a radio resource control (RRC) establishment request message to the base station, where an establishment reason included in the RRC establishment request message is set to be AI-native service establishment;
method 3: sending an RRC recovery request message to the base station, where a recovery reason included in the RRC recovery request message is set to be AI-native service establishment;
method 4: sending first RRC signaling to the base station when the terminal is in an RRC connected state, where the first RRC signaling is an AI-native service establishment request message which includes one or more of: an AI-native service establishment request, an AI-native service type, an AI-native service cycle, an AI-native service life cycle, an AI-native service QoS requirement.

In method 1, a set of dedicated preambles and/or PRACH (Physical Random Access Channel) resources can be pre-specified to be associated with one or a type of AI-native services, and the terminal can use such dedicated preambles and/or PRACH resources to initiate a random access, where the dedicated preambles are used for contention free random access, and the base station can determine, based on the dedicated preambles and/or PRACH resources, that the terminal initiates a request to establish a specific AI-native service.

In one embodiment, the preset preamble and/or the preset PRACH resource can be obtained through the following process:
receiving a system message of a radio access network system sent by the base station, where the system message includes the preset preamble and/or the preset PRACH resource corresponding to the AI-native service; or
receiving, when the terminal is in the RRC connected state, second RRC signaling sent by the base station, where the second RRC signaling includes the preset preamble and/or the preset PRACH resource corresponding to the AI-native service.

In mode 2, if the terminal is in the RRC Idle state, the terminal needs to send an RRC establishment request message to the base station to establish an RRC connection, and the terminal enters the RRC Connected state. An establishment reason included in the RRC establishment request message can be set to be AI-native service establishment, that is, "AI-native service establishment" is added into the EstablishmentCause of the RRC establishment request message RRCSetupRequest. After the base station receives the RRC establishment request message, if it is determined that the establishment reason included in the RRC establishment request message is AI-native service establishment, it can be determined that the terminal has initiated an AI-native service establishment request.

In mode 3, if the terminal is in the RRC Inactive state, the terminal needs to send an RRC recovery request message to the base station to recover the RRC connection, and the terminal enters the RRC Connected state. A recovery reason included in the RRC recovery request message can be set to be AI-native service establishment, that is, "AI-native service establishment" is added into the ResumeCause of the RRC recovery request message RRCResumeRequest or RRCResumeRequest1. After the base station receives the RRC recovery request message, if it is determined that the recovery reason included in the RRC recovery request message is AI-native service establishment, it can be determined that the terminal has initiated an AI-native service establishment request.

In mode 4, if the terminal is in the RRC Connected state, the terminal can send first RRC signaling to the base station. The first RRC signaling is an AI-native service establishment request message and may include but is not limited to one or more of: an AI-native service establishment request, an AI-native service type, an AI-native service cycle, an AI-native service life cycle, an AI-native service QoS (Quality of Service) requirement (such as data volume, latency, reliability). The information such as the AI-native service type, the AI-native service cycle, the AI-native service life cycle, the AI-native service QoS (Quality of Service) requirement (such as data volume, latency, reliability) can be used by the base station to determine which AI-native service(s) to be established by the request from the terminal, as well as which radio bearer (RB) to be adopted for transmission, etc., which are not limited here. It should be noted that one piece of first RRC signaling may include the above information of one or more AI-native services, that is, establishment of one or more AI-native services can be requested via one piece of the first RRC signaling.

It should be noted that the above four methods can be combined in a case that no conflict occurs, which is not limited in the present disclosure.

S202, receiving AI-native service establishment indication information sent by the base station.

In this embodiment, after receiving the AI-native service establishment request sent by the terminal, the base station can determine, according to the AI-native service request, whether to accept the terminal to establish the AI-native service. After determining to accept the terminal to establish the AI-native service, the base station can send the AI-native service establishment indication information to the terminal, to indicate that the terminal can establish the AI-native service.

In one embodiment, the base station may send any of the following messages to the terminal, where any of the following messages includes the AI-native service establishment indication information: an RRC connection establishment message, an RRC connection reconfiguration message, an RRC connection recovery message, and third RRC signaling. Where the third RRC signaling is a separate RRC signaling, that is, a separate RRC signaling can be used to transmit the AI-native service establishment indication information. In another optional embodiment, the base station may also send the AI-native service establishment indication information to the terminal through SRB0.

In one embodiment, when it is necessary to adopt a DRB (Data Radio Bearers) as the RB carrying the AI-native service, for transmitting the data and/or the signaling of the AI-native service over the DRB, the base station needs to establish a dedicated RB for carrying the AI-native service and then have the AI-native service establishment indication information to carry a DRB configuration parameter. The terminal can establish the corresponding DRB according to the DRB configuration parameter, and the data and/or the signaling of the AI-native service can be transmitted over the DRB between the base station and the terminal.

S203, transmitting, according to the AI-native service establishment indication information, data and/or signaling of the AI-native service between the terminal and the base station over a radio bearer (RB) carrying the AI-native service.

In this embodiment, after receiving the AI-native service establishment indication information sent by the base station, the terminal can determine, according to the AI-native service establishment indication information, that the base station accepts the terminal to establish the AI-native service, and then can transmit the data and/or the signaling of the AI-native service between the terminal and the base station over the designated RB carrying the AI-native service.

The RB carrying the AI-native service includes but is not limited to SRB0, SRB1, SRB2 or DRB.

In one embodiment, the RB carrying the AI-native service is as follows:

1) in a case that air interface security is not activated, SRB0 is adopted as the RB carrying the AI-native service; the data and/or the signaling of the AI-native service can be transmitted between the base station and the terminal over SRB0; where this approach is suitable for an AI-native service that does not require high-level security and transmission reliability;

2) after air interface security is activated, SRB1 or SRB2 is adopted as the RB carrying the AI-native service; the data and/or the signaling of the AI-native service can be transmitted between the base station and the terminal over SRB1 or SRB2; in addition, in one embodiment, new SRBx can also be adopted as the RB carrying the AI-native service;

3) after air interface security is activated, a DRB dedicated to carrying the AI-native service is established according to an AI-native service requirement, and the AI-native service establishment indication information is sent to the terminal, where the AI-native service establishment indication information includes a DRB configuration parameter, and the terminal establishes a corresponding DRB according to the DRB configuration parameter for transmission of the data and/or the signaling of the AI-native service over the DRB between the base station and the terminal; in one embodiment, one or more DRBs can be established for an AI-native service;

4) if the terminal is in the RRC inactive state, a DRB carrying the AI-native service pre-stored in terminal context is recovered in a case that the terminal does not enter an RRC connected state; and the data and/or the signaling of the AI-native service can be transmitted between the base station and the terminal over the recovered DRB carrying the AI-native service.

In the transmission method for an AI-native service provided by this embodiment, the terminal sends the AI-native service establishment request to the base station through the air interface signaling; the base station determines to establish the AI-native service according to the AI-native service establishment request and sends the AI-native service establishment indication information to the terminal; then the data and/or the signaling of the AI-native service can be transmitted between the base station and the terminal over the radio bearer (RB) carrying the AI-native service. In this embodiment, the data and/or the signaling of the AI-native service serves as an independent service flow, and is transmitted over a specific radio bearer between the base station and the terminal, to ensure reliable transmission of the data and/or the signaling of the AI-native service.

Figure 3:
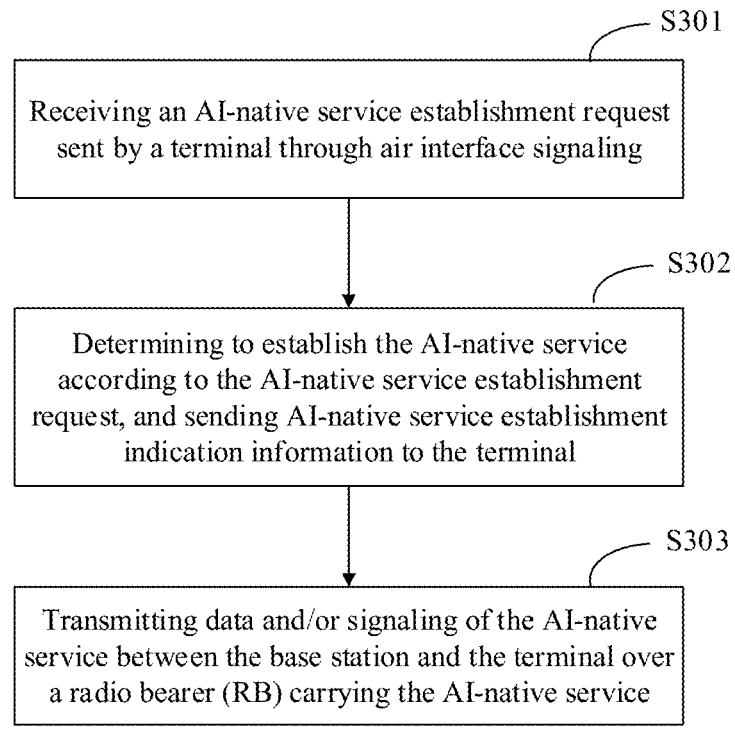
FIG. 3 is a flow chart of a transmission method for an AI-native service provided by another embodiment of the present disclosure.

FIG. 3 is a flow chart of a transmission method for an AI-native service provided by an embodiment. As shown in FIG. 3, this embodiment provides a transmission method for an AI-native service, and the execution body is the base station. Specific steps of the method are as follows:

S301, receiving an AI-native service establishment request sent by a terminal through air interface signaling;

S302, determining to establish the AI-native service according to the AI-native service establishment request, and sending AI-native service establishment indication information to the terminal;

S303, transmitting data and/or signaling of the AI-native service between the base station and the terminal over a radio bearer (RB) carrying the AI-native service.

Based on the above embodiments, the RB may include signaling radio bearers: SRB0, SRB1, SRB2 or a data radio bearer (DRB).

Based on any of the above embodiments, the transmitting the data and/or the signaling of the AI-native service between the base station and the terminal over the radio bearer (RB) carrying the AI-native service includes:

adopting SRB1 or SRB2 as the RB carrying the AI-native service, after air interface security is activated;

transmitting the data and/or the signaling of the AI-native service between the base station and the terminal over SRB1 or SRB2; or adopting SRB0 as the RB carrying the AI-native service, if the air interface security is not activated;

transmitting the data and/or the signaling of the AI-native service between the base station and the terminal over SRB0.

Based on any of the above embodiments, the sending the AI-native service establishment indication information to the terminal includes:

after air interface security is activated, establishing, according to an AI-native service requirement, a DRB dedicated to carrying the AI-native service, and sending the AI-native service establishment indication information to the terminal, where the AI-native service establishment indication information includes a DRB configuration parameter, and the terminal establishes a corresponding DRB according to the DRB configuration parameter for transmission of the data and/or the signaling of the AI-native service over the DRB.

Based on any of the above embodiments, the transmitting the data and/or the signaling of the AI-native service between the base station and the terminal over the radio bearer (RB) carrying the AI-native service includes:
if the terminal is in an RRC inactive state, recovering, in a case that the terminal does not enter an RRC connected state, a DRB carrying the AI-native service pre-stored in terminal context;
transmitting the data and/or the signaling of the AI-native service between the base station and the terminal over the recovered DRB carrying the AI-native service.

Based on any of the above embodiments, the sending the AI-native service establishment indication information to the terminal includes:
sending any of following messages to the terminal, where any of the following messages includes the AI-native service establishment indication information:
an RRC connection establishment message, an RRC connection reconfiguration message, an RRC connection recovery message, and third RRC signaling.

The transmission method for an AI-native service provided in this embodiment is the method by the base station side in the above embodiment, and is based on the same application concept. Since the method and the apparatus solve the problem in a similar principle, repeated details will not be described again.

In order to further introduce the above transmission method for the AI-native service, embodiments of the present disclosure further provide the following examples for detailed illustration.

Example 1: A Terminal in an RRC Idle State Establishes an AI-Native Service (1)

A set of dedicated preambles and/or PRACH resources are pre-specified to be associated with one or a type of AI-native services. The terminal can use such dedicated preambles and/or PRACH resources to initiate a random access. The base station can determine, based on the dedicated preambles and/or PRACH resources, that the terminal initiates a request to establish a specific AI-native service. The dedicated preambles and/or PRACH resources are broadcast in a system message of a wireless access network, and the base station can send the dedicated preamble/PRACH resource configuration for the AI-native service establishment request in the system message.

In this example, for the terminal in the RRC Idle state, the transmission method for an AI-native service may include:
step 1, the terminal reads the system message and determines the dedicated preamble and/or the PRACH resource for the AI-native service establishment request;
step 2, when the terminal needs to initiate the AI-native service, it triggers a random access process and sends a random access request to the base station by using the dedicated preamble and/or the PRACH resource;
step 3, the base station receives the random access request sent by the terminal, and determines, according to the dedicated preamble and/or the PRACH resource, that the terminal initiates an AI-native service establishment process;
step 4, the terminal sends an RRC connection establishment request message to the base station, where the reason for the connection establishment request can be "AI-native service establishment" (optional) or others;
step 5, the base station receives the RRC connection establishment request message sent by the terminal, and establishes the radio bearer (RB) of the AI-native service by one of the following approaches, where the RB can be an SRB or a DRB;
without establishing a connection with the core network, using SRB0 for transmission of the data and/or the signaling of the AI-native service between the base station and the terminal; where this approach is suitable for an AI-native service with low-level security and transmission reliability requirements; or
establishing a connection with the core network for the terminal, after air interface security is activated, using a dedicated SRB (SRB1 or SRB2 or a new SRBx) for transmission of the data and/or the signaling of the AI-native service; or
establishing a connection with the core network for the terminal, after air interface security is activated, according to the AI-native service requirement, establishing a DRB dedicated to carrying the AI-native service (there can be one or more DRBs that carry the AI-native service) for this DRB to carry the data stream transmission of the data and/or the signaling of the AI-native service;
step 6, the base station sends the AI-native service establishment indication information to the terminal, where the indication information can be sent through an RRC connection establishment message or an RRC connection reconfiguration message, or the AI-native service establishment indication information is sent to the terminal through SRB0; in one embodiment, the indication information can include an AI-native service parameter, such as a DRB ID, layer 2 configuration (such as PDCP, RLC, MAC configuration, etc.) and layer 1 configuration, etc.; and
step 7, the terminal establishes the RB carrying the AI-native service according to the indication from the base station through the RRC connection establishment message or the RRC connection reconfiguration message, and performs transmission of the data and/or the signaling of the AI-native service between the terminal and the base station over the RB, where the RB may be an SRB or a DRB.

Example 2: A Terminal in an RRC Idle State Establishes an AI-Native Service (2)

In this example, for the terminal in the RRC Idle state, the transmission method for an AI-native service may include:
step 1, when the terminal needs to initiate the AI-native service, it triggers a random access process and sends a random access request to the base station;
step 2, the base station receives the random access request sent by the terminal; and the base station can respond to the random access request sent by the terminal;
step 3, the terminal sends an RRC connection establishment request message to the base station (for example, the RRC connection establishment request is carried by Msg3 or MSGB), where the connection establishment request reason is "AI-native service establishment"; in one embodiment, the RRC connection establishment request message can also carry AI-native service requirement information, such as an AI-native service type, an AI-native service life cycle, an AI-native service QoS requirement, etc.;

step 4, the base station receives the RRC connection establishment request message sent by the terminal, and determines that the terminal would initiate an AI-native service establishment process;

step 5, based on the content of the AI-native service establishment request from the terminal, the base station establishes the radio bearer (RB) of the AI-native service by one of the following approaches, where the RB can be an SRB or a DRB;

without establishing a connection with the core network, using SRB0 for AI-native service transmission between the base station and the terminal; where this approach is suitable for an AI-native service with low-level security and transmission reliability requirements; or with establishing a connection with the core network for the terminal, after air interface security is activated, using a dedicated SRB (SRB1 or SRB2 or a new SRBx) for the AI-native service transmission; or with establishing a connection with the core network for the terminal, after air interface security is activated, according to the AI-native service requirement, establishing a DRB dedicated to carrying the AI-native service (there can be one or more DRBs that carry the AI-native service) and using this DRB to carry the AI-native service data stream transmission;

step 6, the base station sends the AI-native service establishment indication information to the terminal through the RRC connection establishment message or the RRC connection reconfiguration message; in one embodiment, the AI-native service establishment indication information includes an AI-native service parameter, such as a DRB ID, layer 2 configuration (such as PDCP, RLC, MAC configuration, etc.) and layer 1 configuration, etc.;

step 7, the terminal receives the RRC connection establishment message or the RRC connection reconfiguration message sent by the base station, where such message carries information indicating the AI-native service bearer RB and its configuration; and step 8, the terminal establishes the RB carrying the AI-native service according to the AI-native service bearer information indicated by the base station, and performs transmission of the data and/or the signaling of the AI-native service between the terminal and the base station over the RB, where the RB may be an SRB or a DRB.

Example 3: A Terminal in an Idle State Establishes an AI-Native Service (3)

In this example, for the terminal in the RRC Idle state, the transmission method for an AI-native service may include:

step 1, the terminal initiates a random access process and sends an RRC connection establishment request message to the base station (for example, the RRC connection establishment request is carried in Msg3 or MSGB), where the reason for the connection establishment request can be "AI-native service establishment" (optional) or others;

step 2, the base station responds to the random access process initiated by the terminal, and receives the RRC connection establishment request;

step 3, the terminal establishes an RRC connection according to the RRC connection establishment message from the base station, and then sends RRC signaling for "AI-native service establishment request" to the base station; where the signaling content includes one or more of: an AI-native service establishment request, an AI-native service type, an AI-native service cycle, an AI-native service life cycle, an AI-native service QoS requirement (such as data volume, latency, reliability), etc.; and one piece of the RRC signaling for the "AI-native service establishment request" can include a request for one or more AI-native services;

step 4, after establishing an RRC connection for the terminal, the base station receives the RRC message for the "AI-native service establishment request" sent by the terminal, and establishes one or more DRBs to carry the AI-native service according to the AI-native service requirement from the terminal; as for the DRB establishment process, please see the above embodiments;

step 5, the base station sends an RRC connection reconfiguration message including AI-native service bearer configuration information to the terminal, where the configuration information includes an AI-native service parameter, such as an AI-native service type, a DRB ID, layer 2 configuration (such as PDCP, RLC, MAC configuration, etc.) and layer 1 configuration;

step 6, the terminal receives the RRC connection reconfiguration message, establishes a corresponding DRB according to the configuration information in the message, and performs transmission of the data and/or the signaling of the AI-native service between the terminal and the base station over the DRB.

Example 4: A Terminal in an RRC Inactive State Establishes an AI-Native Service (1)

A set of dedicated preambles and/or PRACH resources are pre-specified to be associated with one or a type of AI-native services. The terminal can use such dedicated preambles and/or PRACH resources to initiate a random access. The base station can determine, based on the dedicated preambles and/or PRACH resources, that the terminal initiates a request to establish a specific AI-native service. The dedicated preambles and/or PRACH resources are broadcast in a system message of a wireless access network, that is, the base station can send the dedicated preamble/PRACH resource configuration for the AI-native service establishment request in the system message, or before the terminal enters the RRC Inactive state, the base station sends the dedicated preamble/PRACH resource configuration for the AI-native service establishment request to the terminal through RRC dedicated signaling.

In this example, for the terminal in the RRC Inactive state, the transmission method for an AI-native service may include:

step 1, the terminal reads the system message or determines the dedicated preamble/PRACH resource for the AI-native service establishment request through the RRC dedicated signaling before the terminal enters the RRC Inactive state;

step 2, when the terminal needs to initiate the AI-native service, it triggers a random access process and sends a random access request to the base station by using the dedicated preamble/PRACH resource;

step 3, the base station receives the random access request sent by the terminal and determines that the terminal would initiate an AI-native service establishment process;

step 4, the terminal sends an RRC recovery request message (RRCResumeRequest or RRCResumeRequest1) to the base station, where the recovery reason ResumeCause can be "AI-native service establishment" (optional) or others;

step 5, the base station receives the RRC recovery request message sent by the terminal, and establishes the radio bearer (RB) of the AI-native service by one of the following approaches, where the RB can be an SRB or a DRB;

disallowing the terminal to enter the connected state, recovering the RB carrying the AI-native service saved in the RRC-Inactive-state terminal context (UE context), and using the RB for transmission of the AI-native service data stream between the base station and the terminal; or notifying the terminal to enter the connected state and using a dedicated SRB (SRB1 or SRB2 or a new SRBx) for AI-native service transmission; or notifying the terminal to enter the connected state, and according to the AI-native service requirement, establishing a DRB dedicated to carrying the AI-native service (there can be one or more DRBs that carry the AI-native service) for this DRB to carry the data stream transmission of the data and/or the signaling of the AI-native service;

step 6, the base station sends the AI-native service establishment indication information to the terminal, where the indication information can be sent through an RRC recovery message or an RRC connection establishment message or an RRC connection reconfiguration message; in one embodiment, the indication information can include an AI-native service parameter, such as a DRB ID, layer 2 configuration (such as PDCP, RLC, MAC configuration, etc.) and layer 1 configuration, etc.; and the base station establishes a protocol stack for the radio bearer (RB) of the AI-native service;

step 7, the terminal receives the RRC recovery message, RRC connection establishment message or RRC connection reconfiguration message sent by the base station, where such message carries information indicating the AI-native service bearer RB and its configuration; and the terminal establishes the RB carrying the AI-native service based on the AI-native service parameter carried in the message, and performs transmission of the data and/or the signaling of the AI-native service between the terminal and the base station over the RB; where the RB may be an SRB or a DRB.

Example 5: A Terminal in an RRC Inactive State Establishes an AI-Native Service (2)

In this example, for the terminal in the RRC Inactive state, the transmission method for an AI-native service may include:

step 1, when the terminal needs to initiate the AI-native service, it triggers a random access process and sends a random access request to the base station;

step 2, the base station receives the random access request sent by the terminal and responds to the random access request;

step 3, the terminal sends an RRC recovery request message (RRCResumeRequest or RRCResumeRequest1) (which, for example, may be carried by Msg3 or MSGB) to the base station, where the recovery reason is "AI-native service establishment"; in one embodiment, the RRC recovery request message can also carry AI-native service requirement information, such as an AI-native service type, an AI-native service life cycle, an AI-native service QoS requirement, etc.;

step 4, the base station receives the RRC connection recovery request message sent by the terminal, determines that the terminal would initiate an AI-native service establishment process, and establishes the radio bearer (RB) of the AI-native service by one of the following approaches, where the RB can be an SRB or a DRB;

disallowing the terminal to enter the connected state, recovering the RB carrying the AI-native service saved in the inactive-state terminal context (UE context), and using the RB for transmission of the AI-native service data stream between the base station and the terminal; or notifying the terminal to enter the connected state and using a dedicated SRB (SRB1 or SRB2 or a new SRBx) for AI-native service transmission; or notifying the terminal to enter the connected state, and according to the AI-native service requirement, establishing a DRB dedicated to carrying the AI-native service (there can be one or more DRBs that carry the AI-native service) for this DRB to carry the AI-native service data stream transmission;

step 5, the base station sends the AI-native service establishment indication information to the terminal, where the indication information can be sent through an RRC recovery message, an RRC connection establishment message, or an RRC connection reconfiguration message; in one embodiment, the indication information can include an AI-native service parameter, such as a DRB ID, layer 2 configuration (such as PDCP, RLC, MAC configuration, etc.) and layer 1 configuration, etc.; and the base station establishes a protocol stack for radio bearer (RB) of the AI-native service; and step 6, the terminal receives the RRC recovery message or the RRC connection establishment message or the RRC connection reconfiguration message sent by the base station, and according to the configuration information in the message, the terminal establishes the RB carrying the AI-native service, and performs transmission of the data and/or the signaling of the AI-native service over the RB; where the RB may be an SRB or a DRB.

Example 6: A Terminal in an RRC Inactive State Establishes an AI-Native Service (3)

In this example, for the terminal in the RRC Inactive state, the transmission method for an AI-native service may include:

step 1, the terminal initiates a random access process and sends an RRC recovery request to the base station, where the recovery reason can be "AI-native service establishment" (optional) or others;

step 2, the base station responds to the random access process initiated by the terminal, receives the RRC recovery request, and establishes an RRC connection for the terminal;

step 3, the terminal establishes the RRC connection according to the RRC connection recovery message or the RRC connection establishment message from the base station, and then sends RRC signaling for "AI-native service establishment request" to the base station, where the signaling content includes one or more of: an AI-native service establishment request, an AI-native service type, an AI-native service cycle, an AI-native service life cycle, an AI-native service QoS requirement (such as data volume, latency, reliability), etc., one piece of the RRC signaling for the "AI-native service establishment request" can include a request for one or more AI-native services;

step 4, the base station receives the RRC signaling for the "AI-native service establishment request" sent by the terminal, and according to the AI-native service requirement from the terminal, establishes one or more DRBs to carry the AI-native service; where the process of establishing a DRB can be found in the above embodiments;

step 5, the base station sends an RRC connection reconfiguration message including AI-native service bearer configuration information to the terminal, where the configuration information includes an AI-native service parameter, such as an AI-native service type, a DRB ID, layer 2 configuration (such as PDCP, RLC, MAC configuration, etc.) and layer 1 configuration.

step 6, the terminal receives the RRC connection reconfiguration message including the AI-native service bearer configuration, establishes the corresponding DRB according to the configuration parameter, and performs transmission of the data and/or the signaling of the AI-native service between the terminal and the base station over the DRB.

Example 7: A Terminal in an RRC Connected State Establishes an AI-Native Service (1)

A set of dedicated preambles and/or PRACH resources are pre-specified to be associated with one or a type of AI-native services. The terminal can use such dedicated preambles and/or PRACH resources to initiate a random access. The base station can determine, based on the dedicated preambles and/or PRACH resources, that the terminal initiates a request to establish a specific AI-native service. The dedicated preambles and/or PRACH resources are broadcast in a system message of a wireless access network, that is, the base station can send the dedicated preamble/PRACH resource configuration for the AI-native service establishment request in the system message, or the base station sends the dedicated preamble/PRACH resource configuration for the AI-native service establishment request to the terminal through RRC dedicated signaling.

In this example, for the terminal in the RRC Connected state, the transmission method for an AI-native service may include:

step 1, the terminal reads the system message or determines the dedicated preamble/PRACH resource for the AI-native service establishment request through the RRC dedicated signaling;

step 2, when the terminal needs to initiate the AI-native service, it triggers a random access process and sends a random access request to the base station by using the dedicated preamble/PRACH resource;

step 3, the base station receives a non-contention-based random access request sent by the terminal and determines that the terminal initiates an AI-native service establishment process;

step 4, the terminal sends RRC signaling for "AI-native service establishment request" to the base station, where the signaling content includes one or more of an AI-native service establishment request, an AI-native service type, an AI-native service cycle, an AI-native service life cycle, an AI-native service QoS requirement (such as data volume, latency, reliability), etc., one piece of the RRC signaling for the "AI-native service establishment request" can include a request for one or more AI-native services;

step 5, the base station receives the RRC message for the "AI-native service establishment request" sent by the terminal, and according to the AI-native service requirement from the terminal, establishes the radio bearer (RB) of the AI-native service by one of the following approaches, where the RB can be an SRB or a DRB;
  using a dedicated SRB (SRB1 or SRB2 or anew SRBx) for AI-native traffic transmission; or
  establishing a DRB dedicated to carrying the AI-native service (there can be one or more DRBs carrying the AI-native service) for the DRB to carry the AI-native service data stream transmission.

step 6, the base station sends the AI-native service establishment indication information to the terminal via the RRC connection reconfiguration message, where the indication information may include AI-native service configuration information; and step 7, the terminal receives the RRC connection reconfiguration message sent by the base station, where the message carries information indicating the AI-native service bearer RB and its configuration; and the terminal establishes an RB carrying the AI-native service based on the configuration information, and performs transmission of the data and/or the signaling of the AI-native service between the terminal and the base station over the RB; where the RB may be an SRB or a DRB.

Example 8: A Terminal in an RRC Connected State Establishes an AI-Native Service (2)

In this example, for the terminal in the RRC Connected state, the transmission method for an AI-native service may include:

step 1, when the terminal needs to initiate the AI-native service, it sends RRC signaling for "AI-native service establishment request" to the base station, where the signaling content includes one or more of: an AI-native service establishment request, an AI-native service type, an AI-native service cycle, an AI-native service life cycle, an AI-native service QoS requirement (such as data volume, latency, reliability), etc.

step 2, the base station receives the RRC message for the "AI-native service establishment request" sent by the terminal, and based on the AI-native service requirement from the terminal, establishes the radio bearer (RB) of the AI-native service by one of the following approaches, where the RB can be an SRB or a DRB;
  using a dedicated SRB (SRB1 or SRB2 or anew SRBx) for AI-native traffic transmission; or
  according to the AI-native service requirement, establishing a DRB dedicated to carrying the AI-native service (there can be one or more DRBs carrying the AI-native service) for the DRB to carry the AI-native service data stream transmission.

step 3, the base station sends the AI-native service establishment indication information to the terminal via the RRC connection reconfiguration message, where the indication information may include AI-native service configuration information; and step 4, the terminal receives the RRC connection reconfiguration message sent by the base station, where the message carries information indicating the AI-native service bearer RB and its configuration; the terminal establishes an RB carrying the AI-native service based on the configuration information, and performs transmission of the data and/or the signaling of the AI-native service between the terminal and the base station over the RB, where the RB may be an SRB or a DRB.

Figure 4:
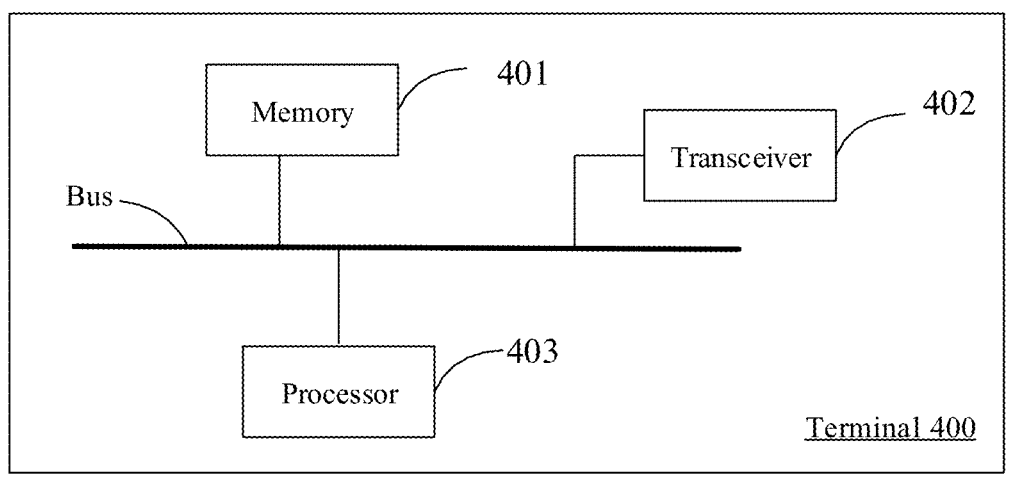
FIG. 4 is a structural diagram of a terminal provided by an embodiment of the present disclosure.

FIG. 4 is a structural diagram of a terminal according to an embodiment of the present disclosure. The terminal provided by this embodiment can execute the processing flow provided by the method embodiments on the terminal side. As shown in FIG. 4, the terminal 400 includes a memory 401, a transceiver 402, and a processor 403.

In FIG. 4, a bus architecture may include any number of interconnected buses and bridges, and various circuits of one or more processors represented by the processor 403 and the memory represented by the memory 401 are linked together. The bus architecture can also link together various other circuits such as peripherals, voltage regulators, and power management circuits, which are all well known in the art and therefore no further description will be given herein. The bus interface provides an interface. The transceiver 402 may be multiple elements, i.e., including a transmitter and a receiver, providing a unit for communicating with various other apparatuses over transmission media, where the transmission media include wireless channels, wired channels, optical cables, and other transmission media. The processor 403 is responsible for managing the bus architecture and general processing, and the memory 401 can store data used by the processor 403 when performing operations.

The processor 403 may be a central processing unit (CPU), an application specific integrated circuit (ASIC), a field programmable gate array (FPGA) or a complex programmable logic device (CPLD). The processor can also adopt a multi-core architecture.

The memory 401 is configured to store a computer program; the transceiver 402 is configured to send and receive data under a control of the processor 403; and the processor 403 is configured to read the computer program in the memory 401 and perform following operations:
  sending an AI-native service establishment request to a base station through air interface signaling;
  receiving AI-native service establishment indication information sent by the base station;
  transmitting, according to the AI-native service establishment indication information, data and/or signaling of an AI-native service between the terminal and the base station over a radio bearer (RB) carrying the AI-native service.

Based on any of the above embodiments, when sending the AI-native service establishment request to the base station through the air interface signaling, the processor 403 is configured to perform at least one of:
  sending a random access request to the base station by using a preset preamble and/or a preset physical random access channel (PRACH) resource corresponding to the AI-native service; or
  sending a radio resource control (RRC) establishment request message to the base station, where an establishment reason included in the RRC establishment request message is set to be AI-native service establishment; or
  sending an RRC recovery request message to the base station, where a recovery reason included in the RRC recovery request message is set to be AI-native service establishment; or
  sending first RRC signaling to the base station when the terminal is in an RRC connected state, where the first RRC signaling is an AI-native service establishment request message which includes one or more of: an AI-native service establishment request, an AI-native service type, an AI-native service cycle, an AI-native service life cycle, an AI-native service QoS requirement.

Based on any of the above embodiments, the AI-native service includes at least one of:
  learning model sharing, computing power sharing, computing power interaction, cloud processing data sharing, and intelligent task segmentation.

Based on any of the above embodiments, before the sending the random access request to the base station by using the preset preamble and/or the preset physical random access channel (PRACH) resource corresponding to the AI-native service, the processor 403 is further configured to:
  receive a system message of a radio access network system sent by the base station, where the system message includes the preset preamble and/or the preset PRACH resource corresponding to the AI-native service; or
  receive, when the terminal is in the RRC connected state, second RRC signaling sent by the base station, where the second RRC signaling includes the preset preamble and/or the preset PRACH resource corresponding to the AI-native service.

Based on any of the above embodiments, when sending the radio resource control (RRC) establishment request message to the base station, the processor 403 is configured to:
  send the radio resource control (RRC) establishment request message to the base station if the terminal is in an RRC idle state.

Based on any of the above embodiments, when sending the RRC recovery request message to the base station, the processor 403 is configured to:
  send the radio resource control (RRC) recovery request message to the base station if the terminal is in an RRC inactive state.

Based on any of the above embodiments, when receiving the AI-native service establishment indication information sent by the base station, the processor 403 is configured to:
  receive any of following messages sent by the base station, where any of the following messages includes the AI-native service establishment indication information:
    an RRC connection establishment message, an RRC connection reconfiguration message, an RRC connection recovery message, and third RRC signaling.

Based on any of the above embodiments, the RB includes signaling radio bearers: SRB0, SRB1, SRB2 or a data radio bearer (DRB).

Based on any of the above embodiments, the AI-native service establishment indication information includes a DRB configuration parameter;
  when transmitting the data and/or the signaling of the AI-native service between the terminal and the base station over the radio bearer (RB) carrying the AI-native service, the processor 403 is configured to:
    establish a DRB according to the DRB configuration parameter;
    transmit the data and/or the signaling of the AI-native service over the DRB.

The terminal provided by the embodiments of the present disclosure can be used to execute the above method embodiments on the terminal side, and the specific functions will not be described here again.

Figure 5:
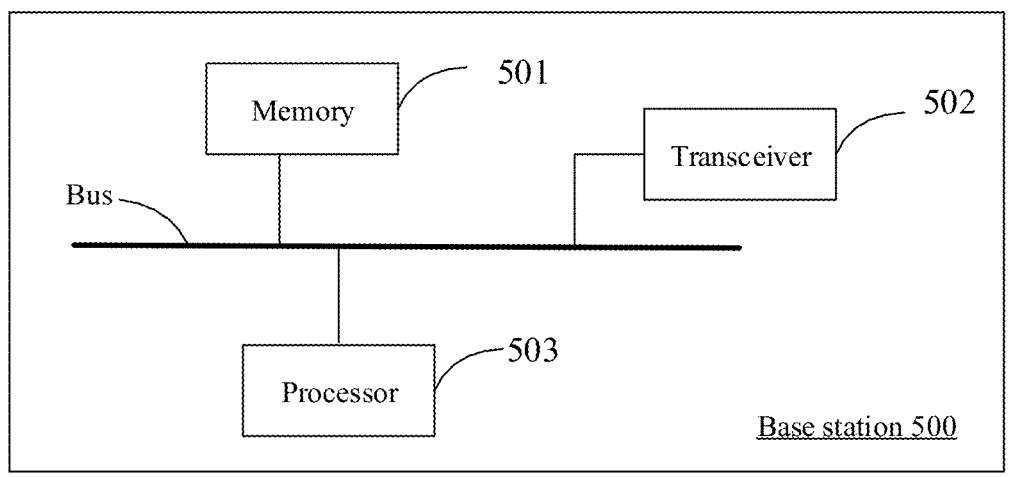
FIG. 5 is a structural diagram of a base station provided by an embodiment of the present disclosure.

FIG. 5 is a structural diagram of a base station according to an embodiment of the present disclosure. The base station provided in this embodiment can execute the processing flow provided by the method embodiments on the base station side. As shown in FIG. 5, the base station 500 includes a memory 501, a transceiver 502, and a processor 503.

In FIG. 5, a bus architecture may include any number of interconnected buses and bridges, and various circuits of one or more processors represented by the processor 503 and the memory represented by the memory 501 are linked together. The bus architecture can also link together various other circuits such as peripherals, voltage regulators, and power management circuits, which are all well known in the art and therefore no further description will be given herein. The bus interface provides an interface. The transceiver 502 may be multiple elements, i.e., including a transmitter and a receiver, providing a unit for communicating with various other apparatuses over transmission media, where the transmission media include wireless channels, wired channels, optical cables, and other transmission media. The processor 503 is responsible for managing the bus architecture and general processing, and the memory 501 can store data used by the processor 503 when performing operations.

The processor 503 may be a central processing unit (CPU), an application specific integrated circuit (ASIC), a field programmable gate array (FPGA) or a complex programmable logic device (CPLD). The processor can also adopt a multi-core architecture.

The memory 501 is configured to store a computer program; the transceiver 502 is configured to send and receive data under a control of the processor 503; and the processor 503 is configured to read the computer program in the memory 501 and perform following operations:
  receiving an AI-native service establishment request sent by a terminal through air interface signaling;
  determining to establish an AI-native service according to the AI-native service establishment request, and sending AI-native service establishment indication information to the terminal;
  transmitting data and/or signaling of the AI-native service between the base station and the terminal over a radio bearer (RB) carrying the AI-native service.

Based on any of the above embodiments, the RB includes signaling radio bearers: SRB0, SRB1, SRB2 or a data radio bearer (DRB).

Based on any of the above embodiments, when transmitting the data and/or the signaling of the AI-native service between the base station and the terminal over the radio bearer (RB) carrying the AI-native service, the processor 503 is configured to:
  adopt SRB1 or SRB2 as the RB carrying the AI-native service, after air interface security is activated;
  transmit the data and/or the signaling of the AI-native service between the base station and the terminal over SRB1 or SRB2; or
  adopt SRB0 as the RB carrying the AI-native service, if the air interface security is not activated;
  transmit the data and/or the signaling of the AI-native service between the base station and the terminal over SRB0.

Based on any of the above embodiments, when sending the AI-native service establishment indication information to the terminal, the processor 503 is configured to:
  after air interface security is activated, establish, according to an AI-native service requirement, a DRB dedicated to carrying the AI-native service, and send the AI-native service establishment indication information to the terminal, where the AI-native service establishment indication information includes a DRB configuration parameter, and the terminal establishes a corresponding DRB according to the DRB configuration parameter for transmission of the data and/or the signaling of the AI-native service over the DRB.

Based on any of the above embodiments, when transmitting the data and/or the signaling of the AI-native service between the base station and the terminal over the radio bearer (RB) carrying the AI-native service, the processor 503 is configured to:
  if the terminal is in an RRC inactive state, recover, in a case that the terminal does not enter an RRC connected state, a DRB carrying the AI-native service pre-stored in terminal context;
  transmit the data and/or the signaling of the AI-native service between the base station and the terminal over the recovered DRB carrying the AI-native service.

Based on any of the above embodiments, when sending the AI-native service establishment indication information to the terminal, the processor 503 is configured to:
  send any of following messages to the terminal, where any of the following messages includes the AI-native service establishment indication information:
    an RRC connection establishment message, an RRC connection reconfiguration message, an RRC connection recovery message, and third RRC signaling.

The base station provided by the embodiments of the present disclosure can be used to perform the above method embodiments on the base station side, and the specific functions will not be described here again.

Figure 6:
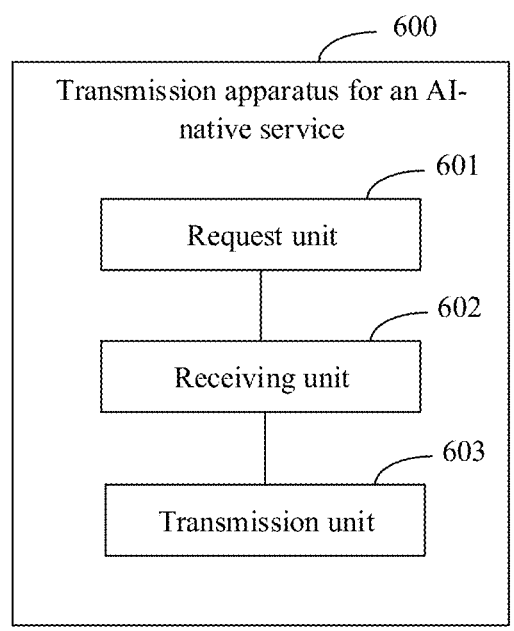
FIG. 6 is a structural diagram of a transmission apparatus for an AI-native service provided by an embodiment of the present disclosure.

FIG. 6 is a structural diagram of a transmission apparatus for an AI-native service provided by an embodiment of the present disclosure. The transmission apparatus for an AI-native service provided by this embodiment can execute the processing flow provided by the method embodiments on the terminal side. As shown in FIG. 6, the transmission apparatus for an AI-native service 600 includes a request unit 601, a receiving unit 602 and a transmission unit 603.

The request unit 601 is configured to send an AI-native service establishment request to a base station through air interface signaling.

The receiving unit 602 is configured to receive AI-native service establishment indication information sent by the base station.

The transmission unit 603 is configured to transmit, according to the AI-native service establishment indication information, data and/or signaling of the AI-native service between the transmission apparatus and the base station over a radio bearer (RB) carrying the AI-native service.

Based on any of the above embodiments, when sending the AI-native service establishment request to the base station through the air interface signaling, the request unit 601 is configured to perform at least one of:
  sending a random access request to the base station by using a preset preamble and/or a preset physical random access channel (PRACH) resource corresponding to the AI-native service; or
  sending a radio resource control (RRC) establishment request message to the base station, where an establishment reason included in the RRC establishment request message is set to be AI-native service establishment; or sending an RRC recovery request message to the base station, where a recovery reason included in the RRC recovery request message is set to be AI-native service establishment; or sending first RRC signaling to the base station when the terminal is in an RRC connected state, where the first RRC signaling is an AI-native service establishment request message which includes one or more of: an AI-native service establishment request, an AI-native service type, an AI-native service cycle, an AI-native service life cycle, an AI-native service QoS requirement.

Based on any of the above embodiments, the AI-native service includes at least one of:

learning model sharing, computing power sharing, computing power interaction, cloud processing data sharing, and intelligent task segmentation.

Based on any of the above embodiments, before sending the random access request to the base station by using the preset preamble and/or the preset physical random access channel (PRACH) resource corresponding to the AI-native service, the receiving unit 602 is further configured to:

receive a system message of a radio access network system sent by the base station, where the system message includes the preset preamble and/or the preset PRACH resource corresponding to the AI-native service; or receive, when the terminal is in the RRC connected state, second RRC signaling sent by the base station, where the second RRC signaling includes the preset preamble and/or the preset PRACH resource corresponding to the AI-native service.

Based on any of the above embodiments, when sending the radio resource control (RRC) establishment request message to the base station, the request unit 601 is configured to:

send the radio resource control (RRC) establishment request message to the base station if the terminal is in an RRC idle state.

Based on any of the above embodiments, when sending the RRC recovery request message to the base station, the request unit 601 is configured to:

send the radio resource control (RRC) recovery request message to the base station if the terminal is in an RRC inactive state.

Based on any of the above embodiments, when receiving the AI-native service establishment indication information sent by the base station, the receiving unit 602 is configured to:

receive any of following messages sent by the base station, where any of the following messages includes the AI-native service establishment indication information:

an RRC connection establishment message, an RRC connection reconfiguration message, an RRC connection recovery message, and third RRC signaling.

Based on any of the above embodiments, the RB includes signaling radio bearers: SRB0, SRB1, SRB2 or a data radio bearer (DRB).

Based on any of the above embodiments, the AI-native service establishment indication information includes a DRB configuration parameter;

when transmitting the data and/or the signaling of the AI-native service between the transmission apparatus and the base station over the radio bearer (RB) carrying the AI-native service, the transmission unit 603 is configured to:

establish a DRB according to the DRB configuration parameter;

transmit the data and/or the signaling of the AI-native service over the DRB.

The transmission apparatus for an AI-native service provided by the embodiments of the present disclosure can be used to execute the above method embodiments on the terminal side, and the specific functions will not be described here again.

Figure 7:
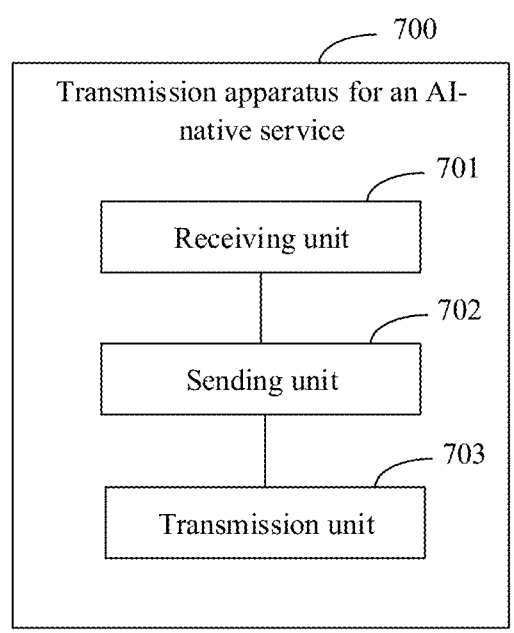
FIG. 7 is a structural diagram of a transmission apparatus for an AI-native service provided by another embodiment of the present disclosure.

FIG. 7 is a structural diagram of a transmission apparatus for an AI-native service provided by an embodiment of the present disclosure. The transmission apparatus for an AI-native service provided by the embodiment can execute the processing flow provided by the method embodiments on the base station side. As shown in FIG. 7, the transmission apparatus for an AI-native service 700 includes a receiving unit 701, a sending unit 702, and a transmission unit 703.

The receiving unit 701 is configured to receive an AI-native service establishment request sent by a terminal through air interface signaling.

The sending unit 702 is configured to determine to establish the AI-native service according to the AI-native service establishment request, and send AI-native service establishment indication information to the terminal.

The transmission unit 703 is configured to transmit data and/or signaling of the AI-native service between the transmission apparatus and the terminal over a radio bearer (RB) carrying the AI-native service.

Based on any of the above embodiments, the RB includes signaling radio bearers: SRB0, SRB1, SRB2 or a data radio bearer (DRB).

Based on any of the above embodiments, when transmitting the data and/or the signaling of the AI-native service between the transmission apparatus and the terminal over the radio bearer (RB) carrying the AI-native service, the transmission unit 703 is configured to:

adopt SRB1 or SRB2 as the RB carrying the AI-native service, after air interface security is activated;

transmit the data and/or the signaling of the AI-native service between the transmission apparatus and the terminal over SRB1 or SRB2; or adopt SRB0 as the RB carrying the AI-native service, if the air interface security is not activated;

transmit the data and/or the signaling of the AI-native service between the transmission apparatus and the terminal over SRB0.

Based on any of the above embodiments, when sending the AI-native service establishment indication information to the terminal, the sending unit 702 is configured to:

after air interface security is activated, establish, according to an AI-native service requirement, a DRB dedicated to carrying the AI-native service, and send the AI-native service establishment indication information to the terminal, where the AI-native service establishment indication information includes a DRB configuration parameter, and the terminal establishes a corresponding DRB according to the DRB configuration parameter for the transmission unit 703 to transmit the data and/or the signaling of the AI-native service over the DRB.

Based on any of the above embodiments, when transmitting the data and/or the signaling of the AI-native service between the transmission apparatus and the terminal over the radio bearer (RB) carrying the AI-native service, the transmission unit 703 is configured to:

if the terminal is in an RRC inactive state, recover, in a case that the terminal does not enter an RRC connected state, a DRB carrying the AI-native service pre-stored in terminal context;

transmit the data and/or the signaling of the AI-native service between the base station and the terminal over the recovered DRB carrying the AI-native service.

Based on any of the above embodiments, when sending the AI-native service establishment indication information to the terminal, the sending unit 702 is configured to:

send any of following messages to the terminal, where any of the following messages includes the AI-native service establishment indication information:

an RRC connection establishment message, an RRC connection reconfiguration message, an RRC connection recovery message, and third RRC signaling.

The transmission apparatus for an AI-native service provided by the embodiments of the present disclosure can be used to perform the above method embodiments on the base station side, and the specific functions will not be described here again.

It should be noted that the division of units in the above embodiments of the present disclosure is as an example and is merely a logical function division. In actual implementation, there may be other division methods. In addition, each functional unit in various embodiments of the present disclosure may be integrated into one processing unit, or each unit may exist physically alone, or two or more units may be integrated into one unit. The above integrated units can be implemented in the form of hardware or software functional units.

When the integrated unit is implemented in the form of a software functional unit and sold or used as an independent product, the integrated unit may be stored in a processor readable storage medium. Based on such an understanding, the embodiments of the present disclosure essentially or the part that contributes to the prior art or all or a part of the embodiments may be implemented in the form of a software product. The software product is stored in a storage medium and includes several instructions for instructing a computer device (which may be a personal computer, a server, a network device, or the like) or a processor to perform all or some steps of the methods described in the embodiments of the present disclosure. The foregoing storage medium includes any medium that can store a program code, such as a USB flash drive, a removable hard disk, a read-only memory (ROM), a random access memory (RAM), a magnetic disk, or an optical disk, etc.

Another embodiment of the present disclosure also provides a computer-readable storage medium. The computer-readable storage medium stores a computer program. The computer program is used to cause a processor to execute a transmission method for an AI-native service on the terminal or base station side.

The computer-readable storage medium may be any available medium or data storage device that the processor can access, including but not limited to a magnetic memory (such as a floppy disk, a hard disk, a tape, a magneto-optical disk (MO), etc.), an optical memory (such as a CD, a DVD, a BD, a HVD, etc.), and a semiconductor memory (such as a ROM, an EPROM, an EEPROM, a non-volatile memory (NAND FLASH), a solid state drive (SSD)), etc.

Another embodiment of the present disclosure also provides a computer program product, which includes a computer program. The computer program is configured to cause a processor to execute the transmission method for an AI-native service on the terminal side or the base station side.

Embodiments of the present disclosure may be provided as methods, systems, or computer program products. Accordingly, the present disclosure may take the form of an entirely hardware embodiment, an entirely software embodiment, or an embodiment that combines software and hardware aspects. Furthermore, the present disclosure may take the form of a computer program product embodied in one or more computer-usable storage media (including, but not limited to, a magnetic disk memory, an optical memory, and the like) having a computer-usable program code embodied therein.

The present disclosure is described with reference to flow charts and/or block diagrams of the methods, the device (systems), and the computer program products according to the embodiments of the present disclosure. It will be understood that each process and/or block in the flow charts and/or block diagrams, and combinations of processes and/or blocks in the flow charts and/or block diagrams, can be implemented by computer-executable instructions. These computer-executable instructions may be provided to a processor of a general-purpose computer, a special-purpose computer, an embedded processor, or other programmable data processing device to produce a machine, and the instructions executed by the processor of the computer or other programmable data processing device produce means for implementing the functions specified in a process or processes in the flow chart and/or in a block or blocks in the a block diagram.

These processor-executable instructions may also be stored in a processor-readable memory that causes a computer or other programmable data processing device to operate in a particular manner, and instructions stored in the processor-readable memory generates a manufactured product including an instruction means. The instruction means implements the function specified in one process or multiple processes in the flow chart and/or one block or multiple blocks in the block diagram.

These processor-executable instructions may also be loaded into a computer or other programmable data processing devices, causing a series of operational steps to be performed in the computer or other programmable devices to produce computer-implemented processing, to cause the instructions that are executed in the computer or other programmable device to provide steps for implementing the functions specified in a process or processes of the flow charts and/or a block or blocks of the block diagrams.

Various changes and modifications to the present disclosure without departing from the spirit and scope of the present disclosure. In this way, if these changes and modifications of the present disclosure fall within the scope of the claims and equivalent technologies of the present disclosure, the present disclosure is also intended to include these changes and modifications.

The invention claimed is:

1. A transmission method for an artificial intelligence (AI)-native service, wherein the method is applied to a terminal and comprises:

sending an AI-native service establishment request to a base station through air interface signaling when the AI-native service needs to be established, wherein the AI-native service establishment request is used to enable the base station to determine whether to accept the terminal to establish the AI-native service;

receiving AI-native service establishment indication information sent by the base station, wherein the AI-native service establishment indication information is used to indicate that the AI-native service is allowed to be established by the terminal;

transmitting, according to the AI-native service establishment indication information, data and/or signaling of the AI-native service between the terminal and the base station over a designated or established radio bearer (RB) carrying the AI-native service;

wherein the sending the AI-native service establishment request to the base station through the air interface signaling comprises at least one of:

sending a random access request to the base station by using a preset preamble and/or a preset physical random access channel (PRACH) resource corresponding to the AI-native service; or sending a radio resource control (RRC) establishment request message to the base station, wherein an establishment reason comprised in the RRC establishment request message is set to be AI-native service establishment; or sending an RRC recovery request message to the base station, wherein a recovery reason comprised in the RRC recovery request message is set to be AI-native service establishment; or sending first RRC signaling to the base station when the terminal is in an RRC connected state, wherein the first RRC signaling is an AI-native service establishment request message which comprises one or more of: an AI-native service establishment request, an AI-native service type, an AI-native service cycle, an AI-native service life cycle, an AI-native service QoS requirement.

2. The method according to claim 1, wherein the AI-native service comprises at least one of:

learning model sharing, computing power sharing, computing power interaction, cloud processing data sharing, and intelligent task segmentation.

3. The method according to claim 1, wherein before sending the random access request to the base station by using the preset preamble and/or the preset physical random access channel (PRACH) resource corresponding to the AI-native service, the method further comprises:

receiving a system message of a radio access network system sent by the base station, wherein the system message comprises the preset preamble and/or the preset PRACH resource corresponding to the AI-native service; or receiving, when the terminal is in the RRC connected state, second RRC signaling sent by the base station, wherein the second RRC signaling comprises the preset preamble and/or the preset PRACH resource corresponding to the AI-native service.

4. The method according to claim 1, wherein the sending the radio resource control (RRC) establishment request message to the base station comprises:

sending the radio resource control (RRC) establishment request message to the base station when the terminal is in an RRC idle state;

wherein the sending the RRC recovery request message to the base station comprises:

sending the radio resource control (RRC) recovery request message to the base station when the terminal is in an RRC inactive state.

5. The method according to claim 1, wherein the receiving the AI-native service establishment indication information sent by the base station comprises:

receiving any of following messages sent by the base station, wherein any of the following messages comprises the AI-native service establishment indication information:

an RRC connection establishment message, an RRC connection reconfiguration message, an RRC connection recovery message, and third RRC signaling.

6. The method according to claim 1, wherein the RB comprises signaling radio bearers: SRB0, SRB1, SRB2 or a data radio bearer (DRB);

wherein the AI-native service establishment indication information comprises a DRB configuration parameter;

the transmitting the data and/or the signaling of the AI-native service between the terminal and the base station over the radio bearer (RB) carrying the AI-native service comprises:

establishing a DRB according to the DRB configuration parameter;

transmitting the data and/or the signaling of the AI-native service over the DRB.

7. A transmission method for an artificial intelligence (AI)-native service, wherein the method is applied to a base station and comprises:

receiving an AI-native service establishment request sent by a terminal through air interface signaling, wherein the AI-native service establishment request is sent when the AI-native service needs to be established, wherein the AI-native service establishment request is used to enable the base station to determine whether to accept the terminal to establish the AI-native service;

determining to establish the AI-native service according to the AI-native service establishment request, and sending AI-native service establishment indication information to the terminal, wherein the AI-native service establishment indication information is used to indicate that the AI-native service is allowed to be established by the terminal;

transmitting data and/or signaling of the AI-native service between the base station and the terminal over a designated or established radio bearer (RB) carrying the AI-native service;

wherein the AI-native service establishment request is sent by the terminal through at least one of:

sending a random access request to the base station by using a preset preamble and/or a preset physical random access channel (PRACH) resource corresponding to the AI-native service; or sending a radio resource control (RRC) establishment request message to the base station, wherein an establishment reason comprised in the RRC establishment request message is set to be AI-native service establishment; or sending an RRC recovery request message to the base station, wherein a recovery reason comprised in the RRC recovery request message is set to be AI-native service establishment; or sending first RRC signaling to the base station when the terminal is in an RRC connected state, wherein the first RRC signaling is an AI-native service establishment request message which comprises one or more of: an AI-native service establishment request, an AI-native service type, an AI-native service cycle, an AI-native service life cycle, an AI-native service QoS requirement.

8. The method according to claim 7, wherein the RB comprises signaling radio bearers: SRB0, SRB1, SRB2 or a data radio bearer (DRB).

9. The method according to claim 8, wherein the transmitting the data and/or the signaling of the AI-native service between the base station and the terminal over the radio bearer (RB) carrying the AI-native service comprises:
adopting SRB1 or SRB2 as the RB carrying the AI-native service, after air interface security is activated;
transmitting the data and/or the signaling of the AI-native service between the base station and the terminal over SRB1 or SRB2; or
adopting SRB0 as the RB carrying the AI-native service, when the air interface security is not activated;
transmitting the data and/or the signaling of the AI-native service between the base station and the terminal over SRB0.

10. The method according to claim 8, wherein the sending the AI-native service establishment indication information to the terminal comprises:
after air interface security is activated, establishing, according to an AI-native service requirement, a DRB dedicated to carrying the AI-native service, and sending the AI-native service establishment indication information to the terminal, wherein the AI-native service establishment indication information comprises a DRB configuration parameter, so that the terminal establishes a corresponding DRB according to the DRB configuration parameter for transmission of the data and/or the signaling of the AI-native service over the DRB.

11. The method according to claim 8, wherein the transmitting the data and/or the signaling of the AI-native service between the base station and the terminal over the radio bearer (RB) carrying the AI-native service comprises:
when the terminal is in an RRC inactive state, recovering, in a case that the terminal does not enter an RRC connected state, a DRB carrying the AI-native service pre-stored in terminal context;
transmitting the data and/or the signaling of the AI-native service between the base station and the terminal over the recovered DRB carrying the AI-native service.

12. The method according to claim 7, wherein the sending the AI-native service establishment indication information to the terminal comprises:
sending any of following messages to the terminal, wherein any of the following messages comprises the AI-native service establishment indication information:
an RRC connection establishment message, an RRC connection reconfiguration message, an RRC connection recovery message, and third RRC signaling.

13. A base station, comprising a memory, a transceiver, and a processor;
wherein the memory is configured to store a computer program; the transceiver is configured to send and receive data under a control of the processor; the processor is configured to read the computer program in the memory and perform the method according to claim 7.

14. A terminal, comprising a memory, a transceiver, and a processor;
wherein the memory is configured to store a computer program; the transceiver is configured to send and receive data under a control of the processor; the processor is configured to read the computer program in the memory to:
send an artificial intelligence (AI)-native service establishment request to a base station through air interface signaling when the AI-native service needs to be established, wherein the AI-native service establishment request is used to enable the base station to determine whether to accept the terminal to establish the AI-native service;
receive AI-native service establishment indication information sent by the base station, wherein the AI-native service establishment indication information is used to indicate that the AI-native service is allowed to be established by the terminal;
transmit, according to the AI-native service establishment indication information, data and/or signaling of an AI-native service between the terminal and the base station over a designated or established radio bearer (RB) carrying the AI-native service;
wherein when sending the AI-native service establishment request to the base station through the air interface signaling, the processor is configured to:
send a random access request to the base station by using a preset preamble and/or a preset physical random access channel (PRACH) resource corresponding to the AI-native service; or
send a radio resource control (RRC) establishment request message to the base station, wherein an establishment reason comprised in the RRC establishment request message is set to be AI-native service establishment; or
send an RRC recovery request message to the base station, wherein a recovery reason comprised in the RRC recovery request message is set to be AI-native service establishment; or
send first RRC signaling to the base station when the terminal is in an RRC connected state, wherein the first RRC signaling is an AI-native service establishment request message which comprises one or more of: an AI-native service establishment request, an AI-native service type, an AI-native service cycle, an AI-native service life cycle, an AI-native service QoS requirement.

15. The terminal according to claim 14,
wherein the AI-native service comprises at least one of: learning model sharing, computing power sharing, computing power interaction, cloud processing data sharing, and intelligent task segmentation.

16. The terminal according to claim 15, wherein before sending the random access request to the base station by using the preset preamble and/or the preset physical random access channel (PRACH) resource corresponding to the AI-native service, the processor is further configured to:
receive a system message of a radio access network system sent by the base station, wherein the system message comprises the preset preamble and/or the preset PRACH resource corresponding to the AI-native service; or
receive, when the terminal is in the RRC connected state, second RRC signaling sent by the base station, wherein the second RRC signaling comprises the preset preamble and/or the preset PRACH resource corresponding to the AI-native service.

17. The terminal according to claim 15, wherein when sending the radio resource control (RRC) establishment request message to the base station, the processor is configured to:
send the radio resource control (RRC) establishment request message to the base station when the terminal is in an RRC idle state;

wherein when sending the RRC recovery request message to the base station, the processor is configured to:
send the radio resource control (RRC) recovery request message to the base station when the terminal is in an RRC inactive state.

18. The terminal according to claim 14, wherein when receiving the AI-native service establishment indication information sent by the base station, the processor is configured to:
receive any of following messages sent by the base station, wherein any of the following messages comprises the AI-native service establishment indication information:
an RRC connection establishment message, an RRC connection reconfiguration message, an RRC connection recovery message, and third RRC signaling.

19. The terminal according to claim 14, wherein the RB comprises signaling radio bearers: SRB0, SRB1, SRB2 or a data radio bearer (DRB);
wherein the AI-native service establishment indication information comprises a DRB configuration parameter;
when transmitting the data and/or the signaling of the AI-native service between the terminal and the base station over the radio bearer (RB) carrying the AI-native service, the processor is configured to:
establish a DRB according to the DRB configuration parameter;
transmit the data and/or the signaling of the AI-native service over the DRB.

* * * * *